US009844892B2

(12) United States Patent
Towner et al.

(10) Patent No.: US 9,844,892 B2
(45) Date of Patent: Dec. 19, 2017

(54) BATTERY OPERATED CHAIN SAW

(71) Applicant: ECHO INCORPORATED, Lake Zurich, IL (US)

(72) Inventors: Stephen J. Towner, Gurnee, IL (US); Brent Peterson, Buffalo Grove, IL (US)

(73) Assignee: ECHO INCORPORATED, Lake Zurich, IL (US)

( * ) Notice: Subject to any disclaimer, the term of this patent is extended or adjusted under 35 U.S.C. 154(b) by 0 days.

(21) Appl. No.: 15/047,813

(22) Filed: Feb. 19, 2016

(65) Prior Publication Data

US 2017/0203463 A1    Jul. 20, 2017

Related U.S. Application Data

(60) Provisional application No. 62/278,743, filed on Jan. 14, 2016.

(51) Int. Cl.
| | |
|---|---|
| B27B 17/08 | (2006.01) |
| B27B 17/12 | (2006.01) |
| B27B 17/02 | (2006.01) |
| B27B 17/00 | (2006.01) |
| B23D 57/02 | (2006.01) |
| B27B 17/14 | (2006.01) |

(52) U.S. Cl.
CPC .......... *B27B 17/083* (2013.01); *B23D 57/023* (2013.01); *B27B 17/0008* (2013.01); *B27B 17/02* (2013.01); *B27B 17/12* (2013.01); *B27B 17/14* (2013.01)

(58) Field of Classification Search
CPC ........ A01G 3/053; H01M 2/1055; B25F 5/02; B23D 57/023; B27B 17/0008; B27B 17/02; B27B 17/083; B27B 17/14; B23B 17/12
USPC ........ 30/122, 381–387, 166.3; 173/217, 170, 173/171; D8/65
See application file for complete search history.

(56) References Cited

U.S. PATENT DOCUMENTS

| 3,418,551 A | * | 12/1968 | Konijnenberg | ......... B26B 19/28 |
| | | | | 30/43.6 |
| 3,530,909 A | * | 9/1970 | Scharpf | ............... B27B 17/0033 |
| | | | | 173/162.1 |
| 3,589,007 A | * | 6/1971 | Walton | .................... B26B 19/28 |
| | | | | 30/140 |
| 5,687,689 A | * | 11/1997 | Santos | ..................... F01P 11/12 |
| | | | | 123/198 E |

(Continued)

*Primary Examiner* — Ghassem Alie
(74) *Attorney, Agent, or Firm* — Wood, Phillips, Katz, Clark & Mortimer

(57) ABSTRACT

A chain saw kit having a sub-frame assembly and a plurality of operating components, among which are at least a battery operated motor and battery. The sub-frame assembly is configured to define mount locations for the operating components so that the sub-frame assembly and operatively placed operating components make up at least a part of a main operating unit to which a chain bar and cutting chain can be assembled. A first outer housing assembly has at least a first outer housing part with a second outer housing assembly having at least a second outer housing part. The parts of the outer housing assemblies are interchangeably usable to allow selection of different overall size, shape, and/or appearance of chain saws based upon a common sub-frame assembly.

23 Claims, 4 Drawing Sheets

(56) References Cited

U.S. PATENT DOCUMENTS

| | | | | |
|---|---|---|---|---|
| 6,016,604 | A * | 1/2000 | Wolf | B25F 5/006 |
| | | | | 30/382 |
| 6,374,501 | B1 * | 4/2002 | Claesson | B23D 47/123 |
| | | | | 125/13.01 |
| 7,699,902 | B2 * | 4/2010 | Ohsawa | F01P 11/12 |
| | | | | 123/198 E |
| 8,424,215 | B2 * | 4/2013 | Quintiliani | B26B 21/522 |
| | | | | 15/143.1 |
| 2006/0254557 | A1 * | 11/2006 | Hamisch | B27B 17/00 |
| | | | | 123/198 E |
| 2009/0284027 | A1 * | 11/2009 | Ogrizek | A47J 43/0705 |
| | | | | 292/256 |
| 2010/0083511 | A1 * | 4/2010 | Shimokawa | B27B 17/00 |
| | | | | 30/381 |
| 2010/0122674 | A1 * | 5/2010 | Junginger | B27B 17/00 |
| | | | | 123/41.65 |
| 2010/0218385 | A1 * | 9/2010 | Mang | A01G 3/053 |
| | | | | 30/216 |
| 2010/0218386 | A1 * | 9/2010 | Ro kamp | A01G 3/053 |
| | | | | 30/277.4 |
| 2012/0066916 | A1 * | 3/2012 | Heinzelmann | B23Q 11/14 |
| | | | | 30/381 |
| 2012/0067608 | A1 * | 3/2012 | Heinzelmann | B25F 5/02 |
| | | | | 173/217 |
| 2014/0283395 | A1 * | 9/2014 | Fu | B27B 17/12 |
| | | | | 30/381 |

* cited by examiner

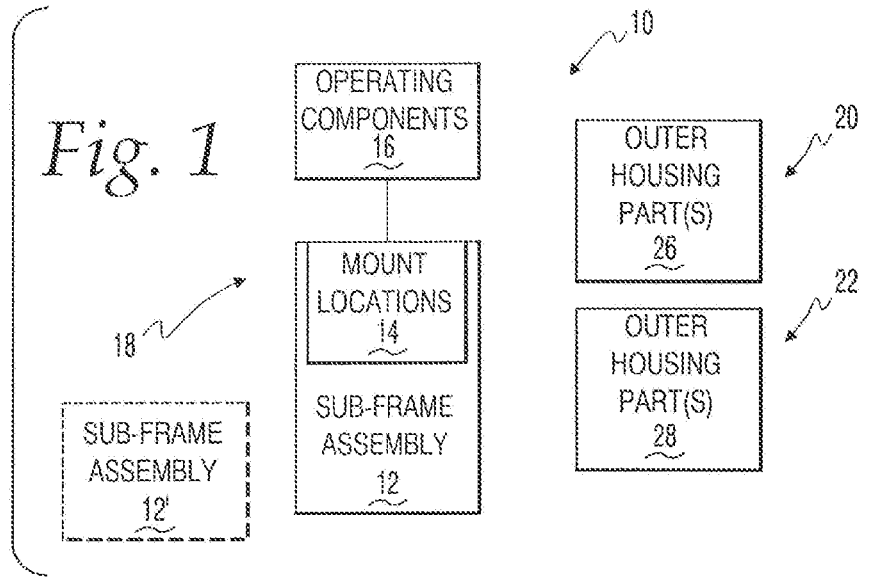
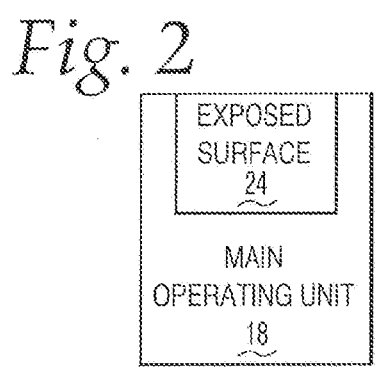
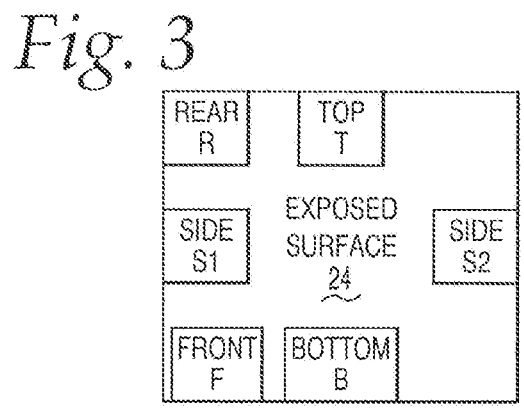
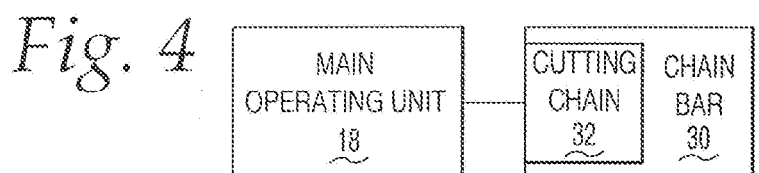
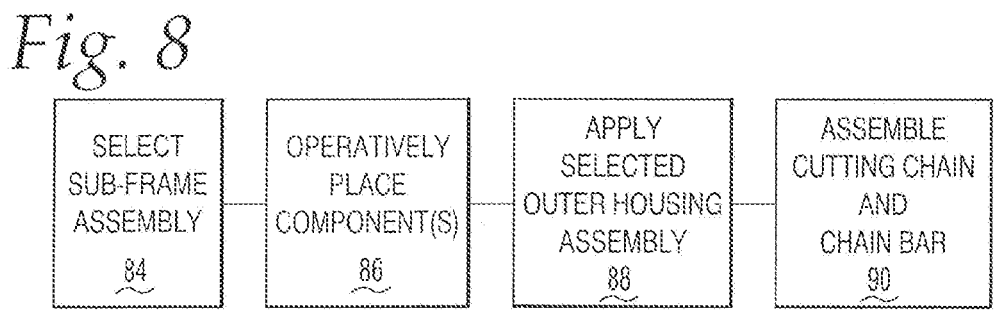

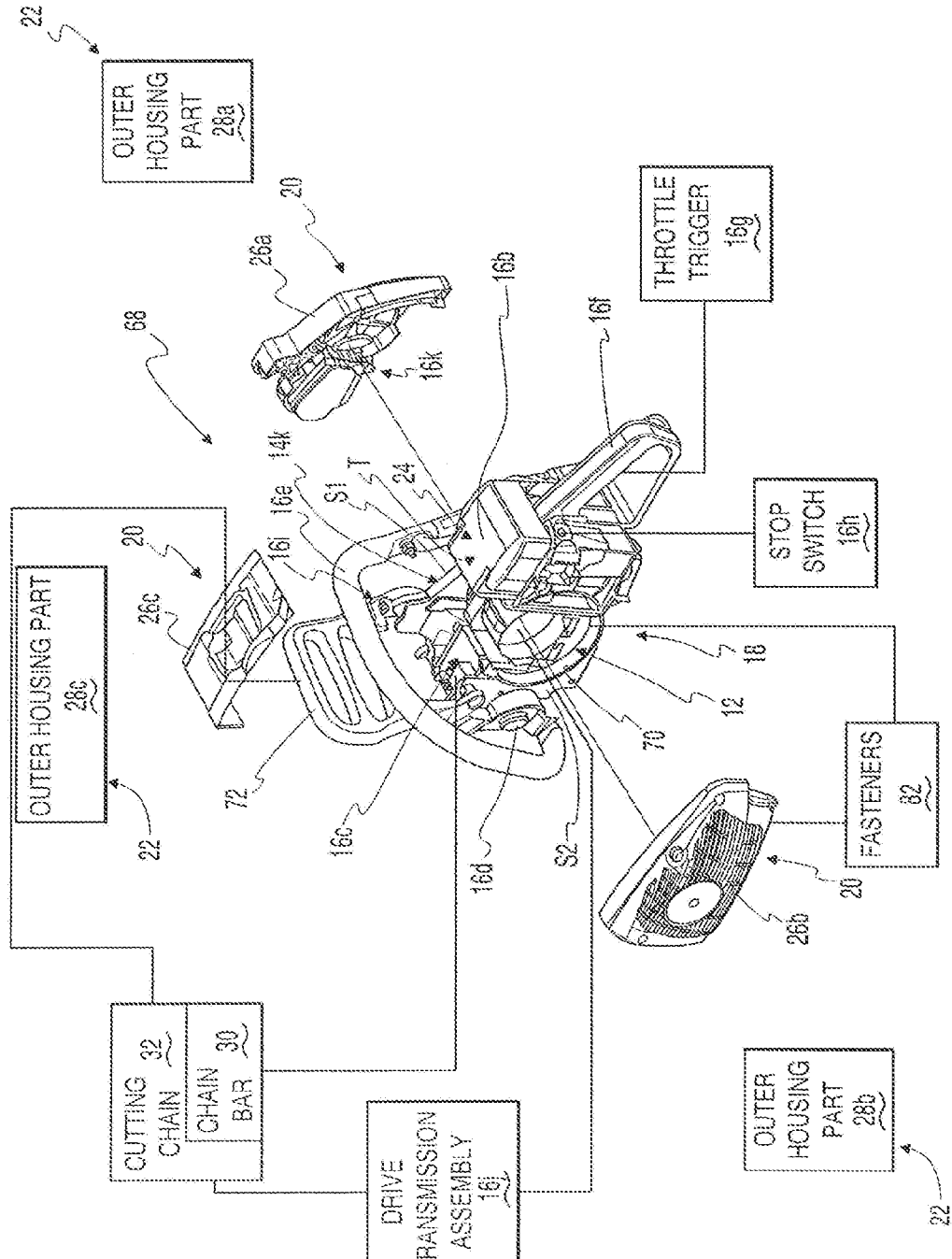

BATTERY OPERATED CHAIN SAW

BACKGROUND OF THE INVENTION

Field of the Invention

This invention relates to portable saws and, more particularly, to a saw having a cutting chain driven by a battery operated motor.

Background Art

Portable saws that utilize a driven cutting chain have been in existence for many decades. In a typical construction, a cutting chain is trained in a track on a cutting bar to move in an endless path. A drive component, which may be in the form of a sprocket or the like, is rotated through a motor to effect driving of the chain.

Chain saws designed for even light, non-professional, use are routinely subjected to heavy loading. Thus, motors for chain saws have generally all been required to generate a relatively high power output.

While battery operated chain saws have been developed over the years, until recently, limitations on battery technology have prevented widespread commercial acceptance of battery operated chain saws as a viable alternative to chain saws with fuel powered engines. Generally, batteries have been deficient in terms of their power output capability as well as their running time between charges. The inability to practically control size and weight of batteries has also impeded the transition from fuel operated chain saws to those powered by batteries.

In recent years, there has been a very dramatic improvement in battery technology that has prompted the use of batteries in a wide range of new product categories, including in chain saws for both non-professional and professional applications. For example, lithium ion battery technology has advanced to the point that compact, relatively lightweight batteries can produce power at levels achievable in the past only through combustion-type engines. This and other advancements in battery technology have led to a very significant industry trend towards supplanting long used lines of chain saws built around combustion engines with those utilizing battery operated drive motors. This trend has been bolstered additionally by the fact that battery operated chain saws have a number of significant functional advantages compared to those built around combustion engines.

Battery operated chain saws generally can operate with less vibration. Battery operated chain saws can also be designed to generate significantly less noise during operation. Importantly, designers of battery operated chain saws do not have to contend with emission control, that has been a vexatious problem, particularly as many jurisdictions adopt increasingly tougher standards for all fuel powered engines.

A major shift in technologies, such as that described above for the chain saw, creates unique challenges for those in this industry. Resources dedicated in the past to highly successful fuel driven products must be diverted to meet anticipated customer demands for battery operated technology. New resources must be allocated for designing, conducting research and development with respect to, and manufacturing, battery operated products. Such a drastic change in direction for some companies may be catastrophic, since they may ultimately be caused to abandon facilities and practices that progressively evolved and were perfected over many decades, and are peculiar to, and not readily adaptable to, the fuel operated model.

Chain saws utilizing combustion engines have heretofore commonly been built around an internal structural frame that results in an endo-skeletal design. That is, the frame is configured to accommodate all of the working components—namely, control boards, oil tanks, fuel tanks, engines, etc.—that are progressively built thereon. Operating handles have been connected to the frame typically through isolation structure that avoids vibration transmission to a user.

On the other hand, the evolving model for battery operated chain saws has predominantly used an exo-skeletal design. That is, the outer housing provides the foundation for the internal components. This model is typical of many battery operated and corded electrical devices that utilize a clam shell configuration.

This latter approach has a number of drawbacks. First of all, the outer housing/frame has a predetermined fixed shape that dictates the end appearance of the chain saw. Little flexibility is allowed in terms of modifying shape or aesthetics. Thus, little flexibility is afforded in differentiating the appearance of products that might have different operating features or capabilities. Essentially, only color and ornamentation, such as decals, are available to effect this differentiation.

Further, an outer frame construction inherently challenges designers to maintain overall structural rigidity, particularly since relatively large loading and impacts are applied to chain saws in their normal operating environment. These forces tend to distort the housing/frame. This distortion may lead to a compromising of the outer housing as well as the internal operating components. A failure of the outer housing may, in a worst case, render the chain saw inoperable and unsalvageable.

As noted above, the new battery operated construction model generally forces personnel involved in all areas of product development, from design to marketing, to learn new processes and techniques. Past engineering practices and techniques, that were applicable to the internal frame construction (endo-skeletal design), may not be usable in a practical sense to design and produce chain saw products with the exo-skeletal design. Further, facilities used to produce fuel powered chain saws may not be practically convertible to allow production of battery powered chain saws.

Still further, as the transition to battery power is taking place, those in the industry may have to provide large volumes of both battery and fuel driven chain saws to the market. The inability to navigate the transitional period and eventually efficiently offer primarily the battery operated product line, may lead to the decline or outright demise of many heretofore successful enterprises.

In short, the chain saw industry has seen a radical shift in the construction of its product and how that product will be developed, manufactured, and marketed in the future. Entities that do not meet this challenge may face serious economic consequences. Businesses are in need of direction to allow them to meet the above challenges in the rapidly evolving industry which embraces battery technology over the familiar and highly evolved fuel operated engine technology.

SUMMARY OF THE INVENTION

In one form, the invention is directed to a chain saw kit having a sub-frame assembly and a plurality of operating components including at least a battery operated motor and a battery. The sub-frame assembly is configured to define mount locations at which each of the plurality of operating components can be operatively placed and maintained so that the sub-frame assembly, in conjunction with the operatively placed operating components, make up at least a part of a main operating unit to which a chain bar and cutting chain can be operatively assembled so that the cutting chain can be driven by the battery operated motor. A first outer housing assembly includes at least a first outer housing part. A second outer housing assembly includes at least a second outer housing part. The main operating unit and first and second outer housing assemblies are configured so that the first and second outer housing assemblies can be operatively mounted selectively, one in place of the other, on the main operating unit to define an assembled unit that has at least one of a different: a) size; b) shape; and c) appearance with the first outer housing assembly operatively mounted on the main operating unit than with the second outer housing assembly operatively mounted on the main operating unit.

In one form, the battery operated motor is fixed to the sub-frame assembly on the main operating unit.

In one form, the plurality of operating components includes a control board assembly.

In one form, the plurality of operating components includes an oil tank that has a fixed configuration on the sub-frame assembly.

In one form, the plurality of operating components includes a graspable operating handle that is one of: a) connected to the sub-frame assembly; or b) an integral part of the sub-frame assembly.

In one form, the plurality of operating components includes at least one of a throttle trigger and stop switch.

In one form, the plurality of operating components includes a brake assembly for a cutting chain.

In one form, the plurality of operating components includes a drive transmission assembly.

In one form, the sub-frame assembly consists of a single piece that defines the graspable operating handle and at least a part of the mount location for at least one of the battery operated motor and battery.

In one form, the chain saw kit has a tensioner assembly for a cutting chain.

In one form, the tensioner assembly is one of: a) directly connected to the sub-frame assembly; and b) joined to one of the first and second outer housing assemblies. The tensioner assembly is operatively connected to the sub-frame assembly through the one of the first and second outer housing assemblies.

In one form, the chain saw kit is provided in combination with a chain bar and a cutting chain that are configured to be operatively assembled to the main operating unit so that the cutting chain can be driven by the battery operated motor.

In one form, the sub-frame assembly has a single piece that defines the mount locations for the plurality of operating components.

In one form, the main operating unit has an exposed surface area. The first outer housing assembly directly overlies the exposed surface area of the main operating unit.

In one form, the first outer housing assembly overlies at least 10% of the exposed surface area of the main operating unit.

In one form, the main operating unit has a top, a bottom, and spaced sides. The first outer housing assembly includes the first outer housing part and at least another outer housing part that overlie the exposed surface area at different ones of the top, bottom, and spaced sides of the main operating unit.

In one form, the main operating unit is configured to be functionally the same with or without the first or second outer housing assemblies operatively mounted on the main operating unit.

In one form, one of the plurality of operating components is integrated into the first outer housing assembly to define a combination assembly that can be repositioned as one piece to be assembled to and disassembled from the main operating unit.

In one form, the single sub-frame assembly piece that defines the mount locations is a non-metal molded piece.

In one form, the chain saw kit further includes another operating component that is configured to be operatively used in place of a corresponding operating component in the plurality of operating components to allow selection of different performance characteristics for the main operating unit.

BRIEF DESCRIPTION OF THE DRAWINGS

FIG. 1 is a schematic representation of a chain saw kit, according to the present invention, and including a main operating unit to which an outer housing assembly, selected from alternative outer housing assembly designs, can be mounted, one in place of the other;

FIG. 2 is a schematic representation of the main operating unit and identifying an exposed surface thereon;

FIG. 3 is a schematic representation identifying different regions of the exposed surface on the main operating unit in FIG. 2;

FIG. 4 is a schematic representation of the main operating unit joined to a cutting bar that operatively supports a cutting chain;

FIG. 7 is a view as in FIG. 6 with the operating components assembled; and

FIG. 8 is a flow diagram representation of a method of manufacturing a chain saw, according to the present invention.

DETAILED DESCRIPTION OF THE PREFERRED EMBODIMENT

Figure 5:
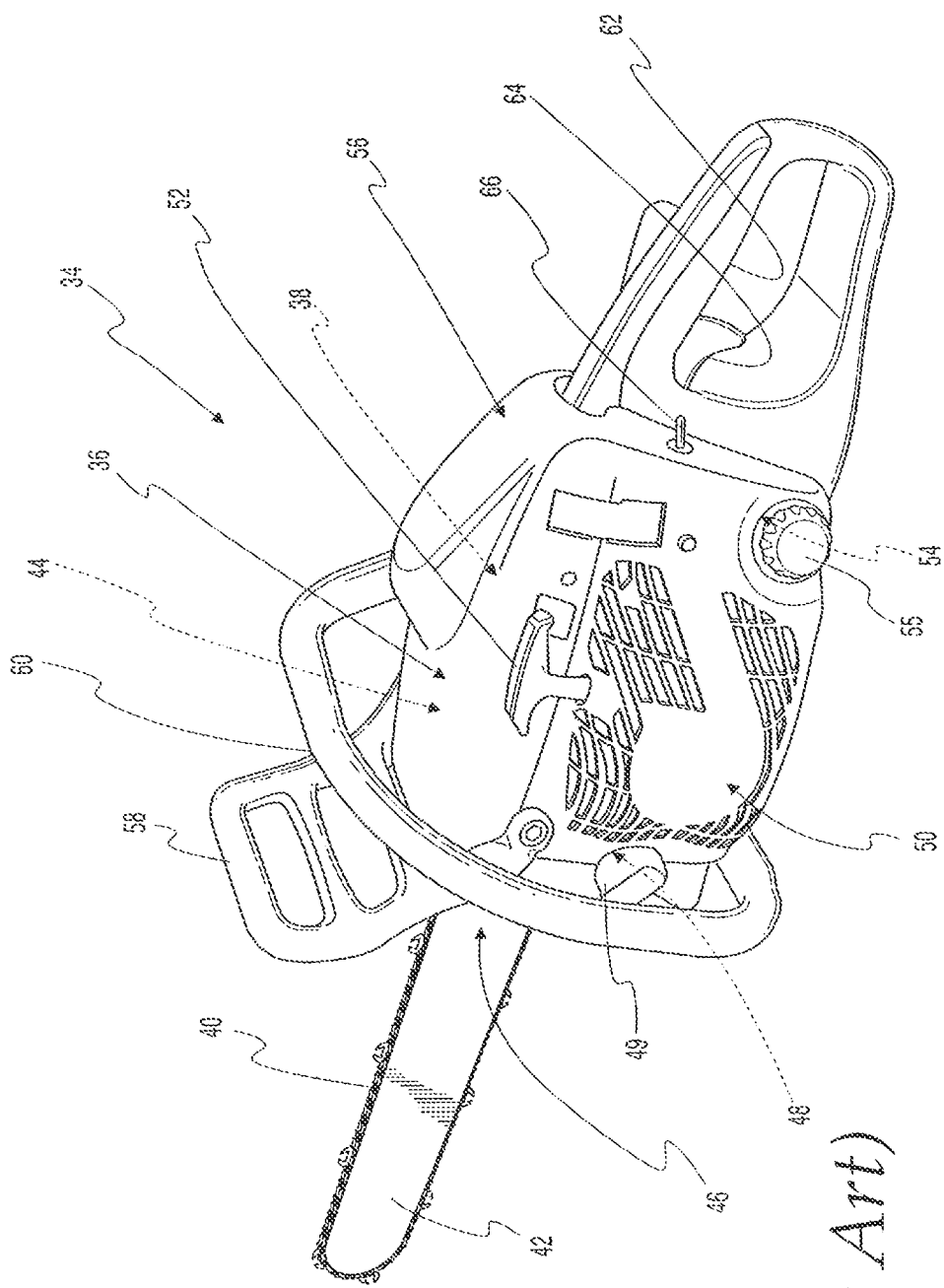
FIG. 5 is a perspective view of a conventional fuel-operated chain saw.

A chain saw kit, according to the present invention, is shown schematically at 10 in FIG. 1. The schematic showing in FIG. 1, as well as in FIGS. 2-4, is intended to encompass specific forms of chain saw components, as described in exemplary forms hereinbelow, and virtually an unlimited number of variations of those components and their interaction.

The base chain saw kit 10 consists of a sub-frame assembly 12 configured to define mount locations 14 at which each of a plurality of operating components 16 can be operatively placed and maintained so that the sub-frame assembly 12, in conjunction with the operatively placed operating components 16, make up at least a part of a main operating unit at 18. The plurality of operating components 16 includes at least a battery operated motor and a battery for supplying power to the motor.

The chain saw kit 10 further includes a first outer housing assembly at 20 and a second outer housing assembly at 22.

The main operating unit 18 and first and second outer housing assemblies 20, 22 are configured so that parts or all of the first and second outer housing assemblies 20, 22 can be operatively mounted selectively, one in place of the other, on the main operating unit 18 to define an assembled unit that has at least one of a different: a) size; b) shape; and c) appearance, with the first outer housing assembly 20 operatively mounted on the main operating unit 18 than with the second outer housing assembly 22 operatively mounted on the main operating unit 18.

As shown schematically in FIG. 2, the main operating unit 18 has an exposed surface 24. The first and second outer housing assemblies 20, 22, when operatively mounted on the main operating unit 18, overlie a substantial area of the exposed surface 24.

As shown further in schematic form in FIG. 3, the total area of the exposed surface 24 exists at several regions of the main operating unit 18—namely, a top T, a bottom B, spaced sides S1, S2, a rear R, and a front F.

The first and second outer housing assemblies 20, 22 may directly overlie the exposed surface 24 on the main operating unit 18. While this is preferred, the invention contemplates that at least one layer/component may reside between the first and second outer housing assemblies 20, 22 and the exposed surface 24.

To appreciably alter the size, shape, and/or appearance of the main operating unit 18, the outer housing assemblies 20, 22 overlie at least 10% of the area of the exposed surface 24. Preferably, the first and second outer housing assemblies 20, 22 overlie a significantly greater percentage of the area of the exposed surface 24—potentially up to 100% thereof. Generally, the greater the areal coverage, the greater the amount of change possible in overall size, shape, and appearance.

The first and second outer housing assemblies 20, 22 respectively are made up of at least one part 26, 28, as shown schematically in FIG. 1.

The first and second outer housing assemblies 20, 22, in one preferred form, overlie at least two of the top T, sides S1, S2, bottom B, rear R, and front F regions. Typically, the primary surface regions focused upon for placement of the outer housing assemblies 20, 22 are the top T, and sides S1, S2.

The particular operating components 16, which are operatively placed and maintained on the sub-frame assembly 12, may range significantly in terms of number and nature. A non-exhaustive list of such potential components includes: a) the aforementioned battery operated motor and battery; b) a control board assembly; c) an oil tank, that may be integrally formed as part of, or operatively placed on, the sub-frame assembly 12; d) one or more graspable operating handles, that may be integral with, or separately constructed and connected to, the sub-frame assembly 12; e) a throttle trigger; f) a stop switch; g) a chain break assembly; h) a drive transmission assembly acting between the motor and cutting chain; i) a tensioner assembly for the cutting chain; and j) other conventionally used operating components.

The selection of operating components 16 may involve different forms of the same type of operating component. For example, different motors may be interchangeably operatively placed at a particular mount location 14. A number of different battery operated motors may be kept on hand with different power ratings. Depending upon a particular model that is being constructed, an assembler will select an appropriate motor from the available options. The same sub-frame assembly 12 may be utilized to construct the main operating unit 18 with different features and performance characteristics.

The schematic showings are intended to encompass numerous different constructions. For example, the operating components 16 may be integrated into the sub-frame assembly 12 to define a fully functioning main operating unit 18 that does not depend on the presence of the first or second outer housing assemblies 20, 22 to be usable in its intended manner. Further, the main operating unit 18 may be configured to be functionally the same with or without the first and second outer housing assemblies 20, 22 mounted on the main operating unit 18.

Any of the operating components 16, such as the battery operated motor, may be fixed to the sub-frame assembly 12 independently of the first and second outer housing assemblies 20, 22.

Alternatively, some or all of the operating components 16 may be required to cooperate with the outer housing assemblies 20, 22 to be operatively maintained on the sub-frame assembly 12.

Certain components 16 may be permanently integrated into the sub-frame assembly 12 so as to be a part thereof. As one example, the aforementioned oil tank may be alternatively: a) integrally formed as part of the sub-frame assembly 12; or b) formed as one of the operating components 16 that is attached to the sub-frame assembly 12.

The same is true of the aforementioned graspable operating handle that may be: a) integrally formed to become part of the sub-frame assembly 12 or; b) a separate operating component 16 that is attached to the sub-frame assembly 12. In the former case, a single piece on the sub-frame assembly may define the graspable operating handle and at least part of a mount location 14 for at least one of the operating components 16.

In an alternative form contemplated within the schematic showings, one of the plurality of operating components 16 may be integrated into one of the first and second outer housing assemblies to define a combination assembly that can be repositioned as one piece to be assembled to, and disassembled from, the remainder of the main operating unit.

The sub-frame assembly 12 may consist of a single piece or multiple joined pieces that define a unitary construction. It is possible in one form to mold the entire sub-frame assembly 12 as a single non-metal piece. Metal construction is, of course, an alternative contemplated construction.

Generally, it is contemplated that the sub-frame assembly 12 is the basic internal (endo-skeletal) building block upon which operating components 16 can be operatively placed and maintained to define either the same configuration for the main operating unit 18 or selectively ones with different performance characteristics.

As shown in FIG. 4, it is contemplated that the main operating unit 18 is usable in combination with a conventional chain bar 30 with an associated cutting chain 32. The chain bar 30 and cutting chain 32 are configured to be operatively assembled to the main operating unit 18 so that the cutting chain 32 can be driven by a battery operated motor that is one of the aforementioned operating components 16.

Certain specific, exemplary, forms of the chain saw kit 10, and other components shown schematically in FIGS. 1-4, will now be described in detail with reference to FIGS. 6 and 7. These specific forms are representative in nature only and are not intended to limit the invention to any depicted part configuration or part interaction. As noted above, the schematic showing of components in FIGS. 1-4 is intended to encompass a wide range of components, with a basic requirement being that the operating component 16 and outer housing assemblies 20, 22 be buildable upon the sub-frame assembly 12 to generate the main operating units 18 with the same or different performance characteristics, essentially in the same manner that conventional gas-powered chain saws, as shown in FIG. 5, are constructed.

Essentially, the main operating unit 18 with the chain bar 30 and cutting chain 32 in place, has an overall configuration that generally parallels the configuration of a conventional gas-powered chain saw as shown in FIG. 5 at 34. Internal detail of this chain saw 34 is shown in U.S. Pat. No. 9,132,568, the disclosure of which is incorporated herein by reference.

Briefly, the chain saw 34 has an outer housing at 36 which surrounds various internal operating components at 38, including a gas operated engine, a drive transmission between the engine and an endless cutting chain 40 on a chain bar 42, and other known components as shown and described in U.S. Pat. No. 9,132,568. The chain saw 34 has a sub-frame 44 upon which the various operating components are mounted. Among the operating components, aside from the engine which is not directly viewable in FIG. 5, are: a) an exhaust/muffler at the location 46; b) an oil tank 48 containing a lubricant for the cutting chain 40 with a removable cap 49; c) a starter assembly 50, incorporation a starting rope that is drawn through a graspable handle 52; d) a fuel tank 54 with a removable cap 55; e) an air cleaner and cover 56; f) a hand-operable brake system 58 for the cutting chain 40; g) front and rear operating handles 60, 62, respectively; h) a throttle trigger 64; and i) a stop switch 66. This is not an exhaustive identification of the operating components, but depicts a general layout thereof.

Figure 6:
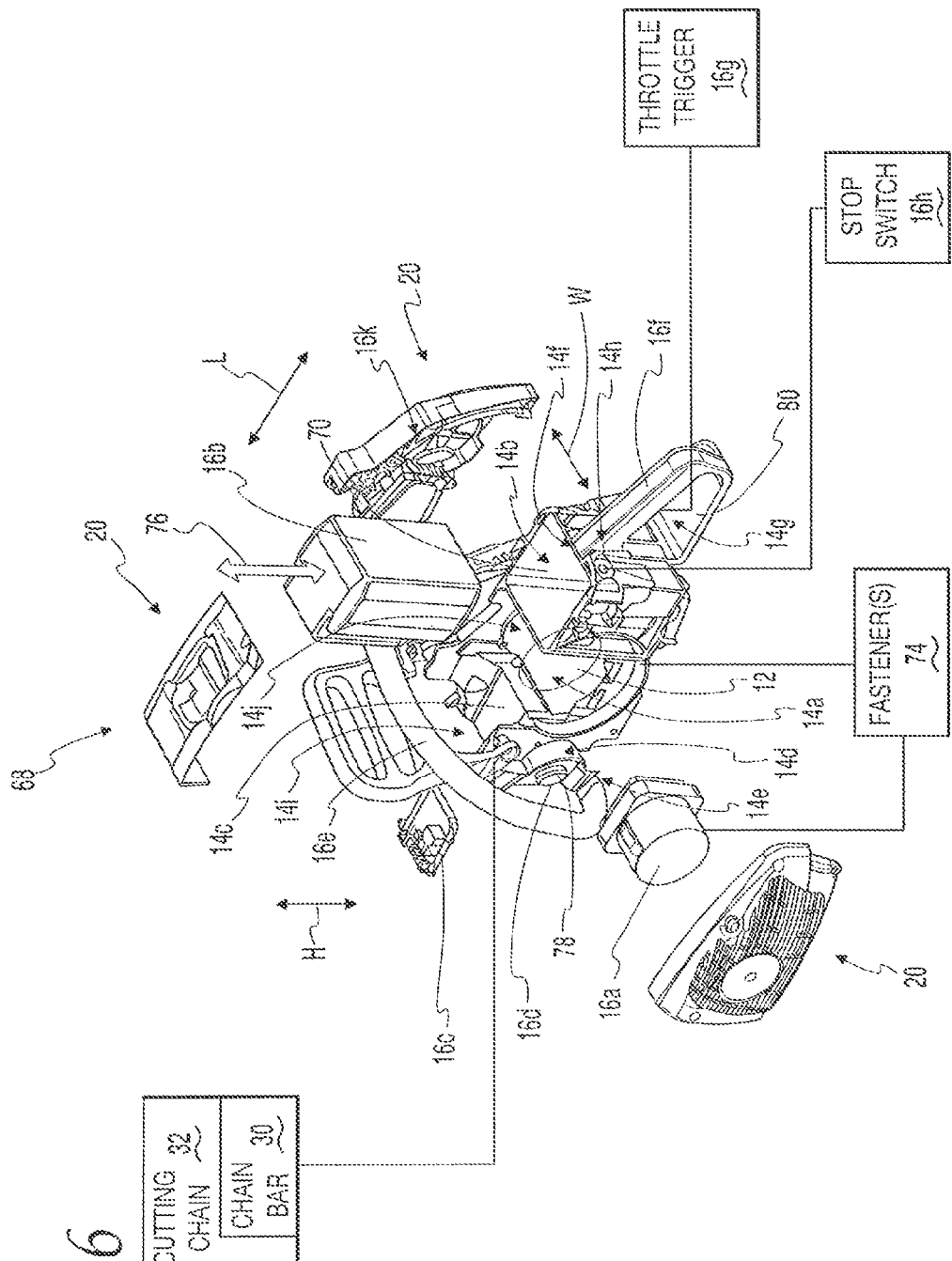
FIG. 6 is an exploded, perspective view of one specific form of the inventive chain saw with a main operating unit having a sub-frame assembly and operating components thereon together with selectively utilizable and different outer housing assembly configurations.

As seen in FIGS. 6 and 7, the inventive chain saw at 68, made up of the main operating unit 18, one of the outer housing assemblies 20, 22, and the cutting bar 30 with the cutting chain 32 thereon, has the same overall arrangement of components as shown for the gas-powered chain saw 34, in terms of an endo-skeletal design and location of corresponding components, including engine and motor, etc.

The sub-frame assembly 12 consists of a single piece 70 that defines the mount locations 14 for the various operating components 16. The single piece 70 may be made from a non-metal material, metal material, or a combination thereof. As depicted, the piece 70 has a molded shape that defines the multiple mount locations 14.

Alternatively, multiple parts may be joined to produce a unitary piece making up the sub-frame assembly 12. Whether one piece, or with a unitary construction, the sub-frame assembly 12 will ideally occupy at least 50% of the total volume of the main operating unit 18. These volumes are compared by using the total volumes within a conforming shape circumscribing each of the sub-frame assembly 12 and main operating unit 18 without considering gaps, openings, or hollows.

The unitary or single piece has a height, a width, and a length corresponding to a height H, width W, and length L of the main operating unit 18, as indicated with double-headed arrows in FIG. 6. At least two, and as depicted all, of the height, width, and length of the unitary piece are equal to at least one half of the corresponding height, width, and length of the main operating unit 18. The values for the height H, width W, and length L are compared using either maximum or average dimensions (H, W, and L) for the unitary/single piece and the main operating unit 18.

As depicted, the operating components 16 consist of: a) the battery operated motor 16a; b) the battery 16b for powering the motor 16a; c) a control board assembly 16c; d) an oil tank 16d; e) graspable front and rear operating handles 16e, 16f, respectively; f) a throttle trigger 16g; g) a stop switch 16h; h) a brake assembly 16i including an operating handle 72; i) a drive transmission assembly 16j; and j) a tensioner assembly 16k for controlling tension on the cutting chain 32.

The sub-frame assembly 12 defines a laterally opening, cup-shaped chamber that is the mount location 14a for the motor 16a. One or more suitable fasteners 74 secure the motor 16a fixedly to the sub-frame assembly 12.

The sub-frame assembly 12 defines a cup-shaped, vertically opening receptacle that is the mount location 14b for the battery 16b. The battery 16b can be moved in the line of the double-headed arrow 76 selectively downwardly to electrically connect to the motor 16a, and upwardly to be separated from the sub-frame assembly 12 to allow recharging or replacement thereof.

The sub-frame assembly 12 defines a shelf that is the mount location 14c for the control board assembly 16c.

Forwardly of the motor 16a, the oil tank 16d is integrated into the sub-frame assembly 12 at the mount location 14d. As noted above, the oil tank 16d may be an integrally formed, sealable chamber with a fixed configuration on the sub-frame assembly 12 that may be selectively blocked and accessed by a cap 78. Alternatively, the oil tank 16d may be a self-contained unit that is added to the sub-frame assembly 12.

The graspable front operating handle 16e has the same general configuration as the front operating handle 60 on the chain saw 34 and is placed and secured to the sub-frame assembly 12 forwardly of the motor 16a at a mount location 14e. The graspable handle 16e may alternatively be integrally formed with a single/unitary piece on the sub-frame assembly 12.

The graspable rear operating handle 16f likewise has the same general configuration as the operating handle 62 on the chain saw 34. The graspable rear operating handle 16f projects from a mount location 14f at the rear of the sub-frame assembly 12 and blends into a flat guard piece 80 which shields the user's hand grasping the rear operating handle 16f. As noted above, the graspable rear operating handle 16f may be integrally formed with the single/unitary piece making up the sub-frame assembly 12, particularly since the motor 16a will not produce vibrations of a magnitude adequate to justify isolation of all operating handles as commonly occurs with a gas engine construction. Separate construction and connection to the sub-frame assembly 12 is also contemplated.

The throttle trigger 16g is situated at a mount location 14g at the underside of the graspable rear operating handle 16f.

The stop switch 16h is at a mount location 14h at the rear of the sub-frame assembly 12 adjacent to the graspable rear operating handle 16f so as to be operable as by a user's thumb on a hand that is grasping the rear operating handle 16f during normal operation.

The handle 72 on the brake assembly 16i is movably mounted in conventional fashion at a mount location 14i on the sub-frame assembly 12 to be conveniently accessible by the same hand of a user that is grasping the front operating handle 16e.

The drive transmission assembly 16j is integrated at a mount location 14j that is adjacent to the chamber defined at the mount location 14a so as to interact with the motor 16a to transmit drive forces from the motor 16a to the cutting chain 32.

The tensioner assembly 16k is operatively placed on the sub-frame assembly 12 at a front and side mount location 14k.

The tensioner assembly 16k may be directly connected to the sub-frame assembly 12 on its own. Alternatively, the tensioner assembly 16k may be joined to a part 26a on the exemplary first outer housing assembly 20 and operatively joined to the sub-frame assembly 12 by reason of the connection of the outer housing part 26a to the sub-frame assembly 12. This connection may be a result of the combination of both connecting alternatives—independent and cooperating component mounting.

The tensioner assembly 16k may be joined to the sub-frame assembly 12 in the same manner through the outer housing part 28a on the second outer housing assembly 22 when the outer housing part 28a is used in place of the outer housing part 26a.

Alternatively, the outer housing part 28a may have an integrated tensioner assembly to define therewith a combination assembly that can be repositioned as one piece to be assembled to and disassembled from the main operating unit 18/sub-frame assembly 12. Integration of the other operating components 16 and outer housing assemblies 20, 22 in like fashion is contemplated for their operative connection to the main operating unit 18/sub-frame assembly 12.

The invention contemplates that all operating components 16 can be operatively placed and maintained at their respective mount locations 14 independently of, or in conjunction with, the first and second outer housing assemblies 20, 22.

As explained above with respect to the generic version of the invention, with the operating components 16 operatively placed and maintained at the respective mount locations 14, the resulting main operating unit 18 is essentially fully functional and could be used in this state for its intended purpose. While the outer housing assemblies 20, 22 might perform a function other than merely contributing to aesthetics and providing a protective, or redundantly protective, shell, in the depicted form, the main operating unit 18 is functionally the same with or without the outer housing assemblies 20, 22 mounted thereto.

The invention does contemplate that one or more of the outer housing parts 26, 28 could perform some limited function, aside from a basic covering function, or a more significant function. As described above, the outer housing assemblies 20, 22 could be used to maintain operating components 16 on the sub-frame assembly 12. Alternatively, as noted above, the operating components may be operatively maintained fixedly on the sub-frame assembly 12 independently of the outer housing assemblies 20, 22.

The outer housing assemblies 20, 22 may directly overlie the exposed surface 24 of the main operating unit 18 to produce a protective housing, that defines an outermost exposed surface, or may be provided over at least one other layer to perform primarily an aesthetic function by reason of changing the size, shape, and/or appearance of the chain saw 68. As noted above, at least one of the size, shape, and appearance of the chain saw 68 is different depending upon which of the outer housing assemblies 20, 22 is utilized.

In the depicted embodiment, the sub-frame 12 with the operating components 16 operatively placed thereon make up the main operating unit 18 that has the exposed surface 24. The outer housing assemblies 20, 22 are shown to directly overlie the exposed surface 24. Each of the depicted outer housing parts 26a, 26b, 26c can be secured in place as by separate fasteners 82 as shown schematically for the outer housing part 28b.

As seen in FIGS. 6 and 7, the outer housing parts 28a, 28b, 28c, making up the outer housing assembly 22 and shown schematically in FIGS. 6 and 7, can be substituted for the depicted specific forms of the housing parts 26a, 26b, 26c, and connected to the main operating unit 18 through fasteners 82 or by any suitable means well-known to those skilled in this art. As just one example, snap-type connections might be utilized for the fasteners 82. The use of all other known types of fasteners that are substitutable are contemplated within the generic showing of the fasteners 82 in FIG. 7.

To account for a significant change in appearance of the completed chain saw 68, it is preferred that the outer housing assemblies 20, 22 overlie at least 10% of the area of the exposed surface 24 of the main operating unit 18. More preferably, at least 40% of this area is covered. This percentage may be significantly greater and conceivably substantially the entire area of the exposed surface 24 may be overlaid by the outer housing assemblies 20, 22.

Further, the number of housing parts 26, 28 is not critical to the present invention. It is conceivable that one outer housing part 26, 28 might be utilized. In the exemplary form, three such parts 26a, 28a; 26b, 28b; 26c, 28c are utilized successively at the side regions S1, S2 and top region T of the exposed surface 24. These are only exemplary locations and shapes for the outer housing parts 26, 28.

With one exemplary form, the outer housing assembly has at least one part, and as depicted in FIGS. 6 and 7, three separate parts 26a, 26b, 26c, each of which overlies primarily one of the top T, front F, rear R, and spaced side S1, S2 regions. In each case, the housing assembly parts 26a, 26b, 26c each has an area that overlies at least one half of the exposed surface area of corresponding regions on the main operating unit 18. The exemplary housing assembly part 26c is configured and attached to the sub-frame assembly 12 so as not to alter function of the main operating unit 18. Rather, it acts as an exposed and decorative "skin". Other housing assembly parts may perform this limited function, or may perform one or more additional functions.

The visual appearance can be changed by potentially changing nothing more than color, applying different markings, decals, etc. Significantly different sizes and shapes of the outer housing parts 26, 28 may permit a very significant change in appearance of the chain saw 68, as to distinguish between models and brands that have different constructions by reason of providing different operating components 16 on the sub-frame assembly 12. As noted above, as one example, different motors can be utilized to produce different chain saw models built on the same sub-frame assembly 12. Different brands might be distinguished by the different outer housing parts 26, 28 which may have the same, or some different, operating components 16 on the same sub-frame assembly 12.

It is important to note that all of the outer housing parts 26, 28 utilized need not be from only one of the outer housing assemblies 20, 22. Parts 26, 28 from the different outer housing assemblies 20, 22 might be combined to produce a chain saw construction with a desired look.

The sub-frame assembly 12 may have a single piece that defines all of the mount locations 14. Preferably, at least a plurality of the mount locations are formed by a single piece made from metal or a non-metal material, such as a plastic, a composite, etc. Multi-part sub-frame assembly constructions are contemplated with it desirable that the resulting sub-frame assembly have a fixed and rigid construction to provide a solid foundation for the operating components 16 and the outer housing assemblies 20, 22.

As a still further modification, as shown in dotted lines in FIG. 1, the chain saw kit 10 may further include a modified sub-frame assembly 12' that can be used in place of the sub-frame assembly 12 for certain chain saw constructions desired. The desired sub-frame construction can be selected as one of the initial manufacturing steps, after which the operating components 16 are serially added.

With the inventive concepts, a chain saw can be manufactured as shown in flow diagram form in FIG. 8. As shown therein at block 84, a sub-frame assembly is selected, potentially from a number of sub-frame assemblies, having different constructions, to accommodate different parts or permit a different assembly method.

As shown at block 86, at least one operating component is operatively placed on the selected sub-frame assembly.

As shown at block 88, a selected outer housing assembly (or a mix of parts from separate outer housing assemblies) is applied to the main operating unit that results from the placement of the operating components on the selected sub-frame assembly. This configuration can be offered by itself. Alternatively, as shown at block 90, a cutting chain and chain bar can be assembled to produce a fully operable chain saw.

The ability to construct chain saws as described above has many potential advantages. First of all, by using the sub-frame assembly to produce an "endo-skeletal" design, battery operated chain saws can be constructed using techniques more in line with those used to construct gas-powered chain saws. Potentially existing assembly lines and tooling and equipment thereon can be readily adapted to change from the gas operated to the battery operated chain saw lines. Expertise acquired by personnel over potentially decades might be adapted readily to the battery powered chain saw design and construction.

By using an endo-skeletal construction versus an exo-skeletal construction, as is currently common to battery operated chain saw constructions, a more rigid structure can potentially be built. With the foundation of an exo-skeletal design effectively encasing the operating components, the chain saw is prone to being distorted and more readily damaged from externally applied forces in use. This is particularly a problem since chain saws are operated in extreme environments and are anticipated to be subjected to tremendous stresses, bending forces, and impacts.

Aside from allowing utilization of acquired familiar design and manufacturing techniques, the battery operated chain saws made according to the invention can readily incorporate all safety features that have proven over the years to be critical in the safe operation of fuel powered chain saws.

With the inventive concept, change in look and function of battery operated chain saws is facilitated, potentially relatively inexpensively. It is also possible to offer consumers after-market options to change features and appearance of chain saws.

Whereas an exo-skeletal chain saw design may make it difficult to inexpensively access internal components, and effect repair and re-assembly, the endo-skeletal design contemplated herein offers the assembly, disassembly, and servicing convenience made possible over decades of evaluation of the basic gas powered chain saw technology.

The foregoing disclosure of specific embodiments is intended to be illustrative of the broad concepts comprehended by the invention.

The invention claimed is:

1. A chain saw kit for use as part of a chain saw of the type including a chain bar and a cutting chain guided in movement by the cutting bar, the chain saw kit comprising:
   an endo-skeletal sub-frame assembly;
   a plurality of operating components comprising at least a battery operated motor, a battery for operating the motor, and a drive transmission assembly through which the cutting chain can be driven by the battery operated motor,
   the endo-skeletal sub-frame assembly configured to define mount locations at which each of the plurality of operating components can be operatively placed and maintained so that the endo-skeletal sub-frame assembly in conjunction with the operatively placed operating components make up at least a part of a main operating unit to which the chain bar and cutting chain can be operatively assembled so that the cutting chain can be driven by the battery operated motor,
   the main operating unit having a top, a bottom, and spaced sides;
   at least three separate outer housing parts including: a) one outer housing part attached to the main operating unit to directly cover the endo-skeletal sub-frame assembly at the top of the main operating unit; b) a second outer housing part attached to the main operating unit to directly cover the endo-skeletal sub-frame assembly at one of the spaced sides of the main operating unit; and c) a third outer housing part attached to the main operating unit to directly cover the endo-skeletal sub-frame assembly at the other of the spaced sides of the main operating unit;
   a first outer housing assembly comprising at least one of the three outer housing parts; and
   a second outer housing assembly comprising at least another outer housing part, that is not one of the three outer housing parts to replace the at least one of the three outer housing parts,
   the main operating unit, the at least one of the three outer housing parts, and the at least another outer housing part configured so that the first and second outer housing assemblies can be operatively mounted selectively, one in place of the other, on the main operating unit to directly cover the endo-skeletal sub-frame assembly to define an assembled unit that has at least one of a different: a) size; b) shape; and c) appearance with the first outer housing assembly operatively mounted on the main operating unit than with the second outer housing assembly operatively mounted on the main operating unit.

2. The chain saw kit according to claim 1 wherein the battery operated motor is fixed to the endo-skeletal sub-frame assembly on the main operating unit.

3. The chain saw kit according to claim 1 wherein the plurality of operating components comprises a control board assembly.

4. The chain saw kit according to claim 1 wherein the plurality of operating components comprises an oil tank that has a fixed configuration on the endo-skeletal sub-frame assembly.

5. The chain saw kit according to claim 1 wherein the plurality of operating components comprises a graspable operating handle that is one of: a) connected to the endo-skeletal sub-frame assembly; or b) an integral part of the endo-skeletal sub-frame assembly.

6. The chain saw kit according to claim 5 wherein the endo-skeletal sub-frame assembly comprises a single piece that defines the graspable operating handle and at least a part of the mount location for at least one of the battery operated motor and battery.

7. The chain saw kit according to claim 5 wherein the endo-skeletal sub-frame assembly comprises a single piece that defines the mount locations for the plurality of operating components.

8. The chain saw kit according to claim 7 wherein the single endo-skeletal sub-frame assembly piece defining the mount locations comprises a non-metal molded piece.

9. The chain saw kit according to claim 7 wherein the single piece and main operating unit each occupies a volume and the occupied volume of the single piece is at least 50% of the occupied volume of the main operating unit.

10. The chain saw kit according to claim 7 wherein the single piece and main operating unit each has a height, a width, and a length, and at least two of the height, width, and length of the single piece are equal to at least one half of a corresponding height, width, and length of the main operating unit.

11. The chain saw kit according to claim 1 wherein the plurality of operating components comprises at least one of a throttle trigger and stop switch.

12. The chain saw kit according to claim 1 wherein the plurality of operating components comprises a brake assembly for the cutting chain.

13. The chain saw kit according to claim 1 wherein the chain saw kit comprises a tensioner assembly for the cutting chain.

14. The chain saw kit according to claim 13 wherein the tensioner assembly is one of: a) directly connected to the endo-skeletal sub-frame assembly and b) joined to one of the first and second outer housing assemblies and operatively connected to the endo-skeletal sub-frame assembly through the one of the first and second outer housing assemblies.

15. The chain saw kit according to claim 1 in combination with the chain bar and the cutting chain that are configured to be operatively assembled to the main operating unit so that the cutting chain can be driven by the battery operated motor.

16. The chain saw kit according to claim 1 wherein the main operating unit has an exposed surface area and the first outer housing assembly directly overlies the exposed surface area of the main operating unit.

17. The chain saw kit according to claim 16 wherein the first outer housing assembly overlies at least 10% of the exposed surface area of the main operating unit.

18. The chain saw kit according to claim 16 wherein the first outer housing assembly comprises the one of the three outer housing parts and at least a second of the three outer housing parts that overlie the exposed surface area at different ones of the top, bottom, and spaced sides of the main operating unit.

19. The chain saw kit according to claim 16 wherein the main operating unit is configured to be functionally the same with or without the first or second outer housing assemblies operatively mounted on the main operating unit.

20. The chain saw kit according to claim 16 wherein the first outer housing assembly overlies at least 40% of the exposed surface area of the main operating unit.

21. The chain saw kit according to claim 1 wherein one of the plurality of operating components is integrated into the first outer housing assembly to define a combination assembly that can be repositioned as one piece to be assembled to and disassembled from the main operating unit.

22. The chain saw kit according to claim 1 wherein the chain saw kit further comprises another operating component that is configured to be operatively used in place of a corresponding operating component in the plurality of operating components to allow selection of different performance characteristics for the main operating unit.

23. The chain saw kit according to claim 1 wherein the one, second, and third outer housing parts are configured to cover the endo skeletal sub-frame assembly successively primarily at the top, the one of the spaced sides, and the other of the spaced sides of the main operating unit.

\* \* \* \* \*